United States Patent [19]

Hansen

[11] Patent Number: 4,469,208

[45] Date of Patent: Sep. 4, 1984

[54] CONTROL FOR DIFFERENTIAL LOCK

[75] Inventor: Kenneth N. Hansen, Waukesha, Wis.

[73] Assignee: Allis-Chalmers Corporation, Milwaukee, Wis.

[21] Appl. No.: 332,232

[22] Filed: Dec. 18, 1981

[51] Int. Cl.³ .............................................. B60K 41/26
[52] U.S. Cl. ..................................... 192/4 A; 74/512; 74/490; 137/354; 251/295
[58] Field of Search ................ 192/4 A, 30 U, 109 D; 248/634, 635; 74/512, 513, 474, 483 PB, 102, 10.33, 490; 180/315, 320, 326, 327; 137/351, 354; 251/77, 78, 295

[56] References Cited

U.S. PATENT DOCUMENTS

| | | | |
|---|---|---|---|
| 2,621,750 | 12/1952 | Wahlberg | 180/315 |
| 3,945,475 | 3/1976 | Khatti | 192/4 A |
| 4,046,021 | 9/1977 | McKee et al. | 74/512 |
| 4,186,930 | 2/1980 | Shulke | 248/634 |

Primary Examiner—George H. Krizmanich
Assistant Examiner—M. Manley
Attorney, Agent, or Firm—Arthur L. Nelson

[57] ABSTRACT

A control mechanism for a differential lock having a control pedal isolated from the operating mechanism for engaging the differential. A platform resiliently mounted on the vehicle allows relative movement between the platform and the chassis. A foot operated control element mounted on the platform extends through the platform to a point adjacent an operating mechanism on the vehicle chassis. The operating mechanism selectively operates the differential lock control valve and in its retracted position completely disengages the operating mechanism. The differential lock valve is maintained by a detent in its actuating position and can be released by operating a brake system having a relay valve in the differential lock valve. When the brake system is operated, the relay valve releases the detent means in the differential lock valve allowing the valve to return to its differential release position and the operating mechanism to return to its retracted position. The foot operated control element does not engage the valve actuating mechanism in its retracted position and only engages the valve actuating mechanism when the differential lock valve is initially actuated.

10 Claims, 3 Drawing Figures

CONTROL FOR DIFFERENTIAL LOCK

This invention relates to a differential lock and more particularly to a foot operated control element isolated from the operating mechanism to operate the differential lock. The control element is mounted on a platform resiliently supported on the vehicle chassis. The control element is isolated and contacts the actuating mechanism only during actuation. In its normally retracted position, it is in spaced relation from the operating mechanism and accordingly does not transmit any sound through the platform.

Differential lock controls operate to selectively engage and disengage the differential lock. Most differential locks are also disengaged by actuation of the vehicle brake to allow relative rotation between the two wheels. A hydraulic detent may be used to retain actuation of differential lock valve and to release the valve when the pressure is released. Release of the pressure for actuating the differential lock allows a spring to return the differential lock control valve to its normally retracted position. A relay valve operating in response to actuation of the brake may be used to block flow of pressurized fluid to the hydraulic detent mechanism and to release fluid pressure to the differential lock. Such a differential lock is shown in U.S. Pat. No. 3,945,475.

The applicants' invention provides for an actuating mechanism for the differential lock in which a push rod operated by a control element is isolated from the actuating mechanism. The control element and push rod are mounted on the platform. The platform and the cab are resiliently mounted on the chassis allowing relative movement between the platform and the chassis. The actuating mechanism is mounted on the vehicle chassis and since there is no direct connection between the actuating mechanism and the control element in the retracted position, no sound is transmitted through the mechanism into the operator compartment.

This mechanism does not provide for the release of the differential lock since this can be accomplished by operating the vehicle brake. Engaging one or both of the brakes will disengage the differential lock allowing differential action of the wheels.

It is an object of this invention to provide a differential lock actuating drive.

It is another object of this invention to provide a control mechanism for a differential lock with an isolated foot operated control element for operating the actuating mechanism. Means for releasing of the differential lock are provided in response to actuation of the vehicle brakes.

It is a further object of this invention to provide a control means for actuating of a differential lock having a foot operated control element mounted on the vehicle platform which is isolated from the vehicle chassis. The control element operates through an actuating mechanism on the chassis which operates to engage the differential lock. In its release position, there is no connection between the control element and the actuating mechanism. Release of the differential is in response to actuation of the vehicle brakes.

The objects of this invention are accomplished in a vehicle having a platform which is resiliently mounted on the vehicle chassis to allow relative movement between the platform and the chassis. A control element having a push rod is reciprocally mounted on the platform with the push rod extending through the platform to operate a bellcrank in the actuating mechanism pivotally supported on the vehicle chassis. The bellcrank operates through a link which is pivotally connected to the spool of the differential lock valve. The push rod presses against a flange on the bellcrank to operate the actuating mechanism. As the control element is retracted, the connection between the control element and the actuating mechanism is interrupted and no sound is transmitted between the chassis and the operator station. The actuating mechanism and the differential lock control valve are free to move to its retracted position responsive to actuation of the vehicle brakes.

Referring to the drawings, the preferred embodiment of this invention is illustrated.

Figure 3:
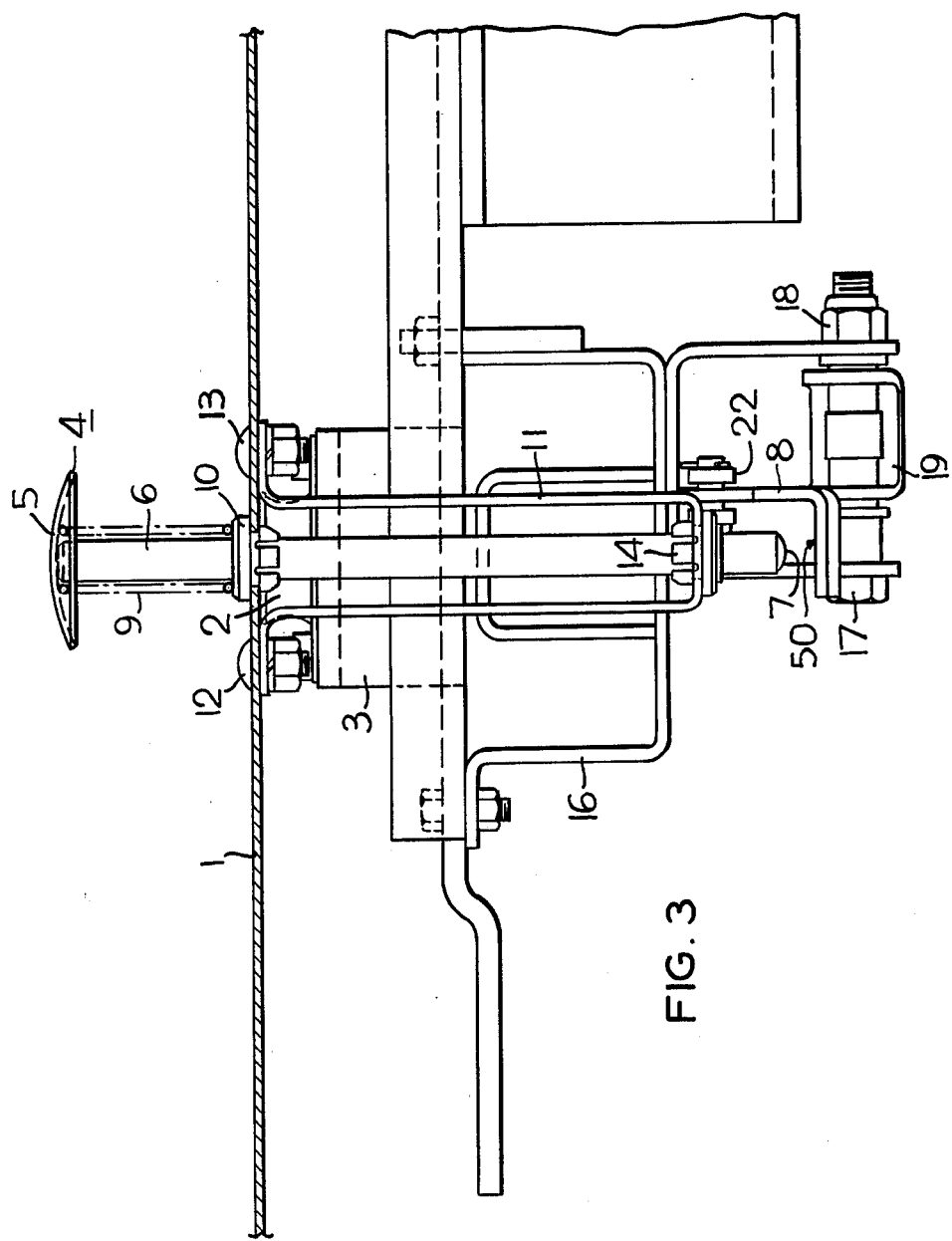
FIG. 3 is an end view of the differential lock control.

Referring to the drawings, the preferred embodiment of this invention is illustrated. The platform 1 is resiliently mounted on a plurality of isolaters 2, of which one is shown, and which are supported on the vehicle chassis 3. The foot operated control element 4 includes a button 5 connected to a push rod 6 extending through the platform 1 to form a rounded end 7 adapted for engaging the bellcrank 8. The push rod 6 is received within the spring 9 which normally biases the control element to the return position. The spring is compressively positioned between the button 5 and the collar 10 which is mounted on the platform 1. The bracket 11 is fastened by the bolts 12 and 13 and comprises a U-shaped configuration as shown in FIG. 3. The bracket carries a sleeve 14. Sleeve 14 includes an expansible flange which snaps into the opening in the bracket. The sleeve guides the lower end of the push rod 6.

The bracket 16 is carried on the chassis 3 and provides a support for the bellcrank 8. Bellcrank 8 is pivotally supported on bolt 17 which is fastened by the nut 18. The bellcrank 8 forms a U-shaped portion 19 comprising the bearing for supporting the bellcrank. The bellcrank also forms a flange 20 which is adapted for engaging a rounded end 7 of the push rod 6. The bellcrank 8 operates through the link 21 which is pivotally connected through the clevis 22. An adjustable threaded end of the link 21 and lock nut 23 provide an adjustment of the mechanism.

Link 21 extends to the spool 24 of the control valve 25. A disengaged position 26 is shown to the right of the engaged position 27. Spool 24 selectively operates the differential valve. The pump 28 receives fluid from the reservoir 29 and pressurizes fluid in the conduit 30. The relief valve 31 allows excess pressurized fluid to return to the reservoir 29. Fluid in the conduit 30 is transmitted to the pump chamber 32 and passes through the passage 33 and to the hydraulic actuator 35 in the differential clutch 34. Pressurized fluid from passage 33 also enters the passage 36 and the spring chamber 37 to retain the control valve in its actuated position during normal operation.

Vehicle brakes 38 and 39 are actuated by the pedals 40 and 41 operating master cylinders 42 and 43. The conduit 44 pressurizes fluid in the chamber 45 to operate the relay valve 46. The master cylinder 43 pressurizes fluid in conduit 47 and chamber 48 to operate the relay valve. Operation of the relay valve will close the passage 33 and direct the fluid in the spring chamber 37 to sump 29 through passage 48. The spring 49 biases the spool 24 to its retracted position when pressure in the passage 36 is vented to the reservoir 29.

The differential valve is normally held in the actuated position by the fluid pressure in the chamber 37 and retracted by the spring 49 when the pressure is released in response to actuation of either one or both of the brakes.

The operation of the device will be described in the following paragraphs:

When the foot operated control element 4 is in its retracted position, rounded end 7 of the push rod 6 is in spaced relation to the surface 50 of the bellcrank 8. The actuating mechanism 51 is returned to the disengaged position 26 responsive to the biasing force of the return spring 49 which has returned the control valve to the disengaged position 26. The differential lock clutch is in the disengaged position.

Figure 1:
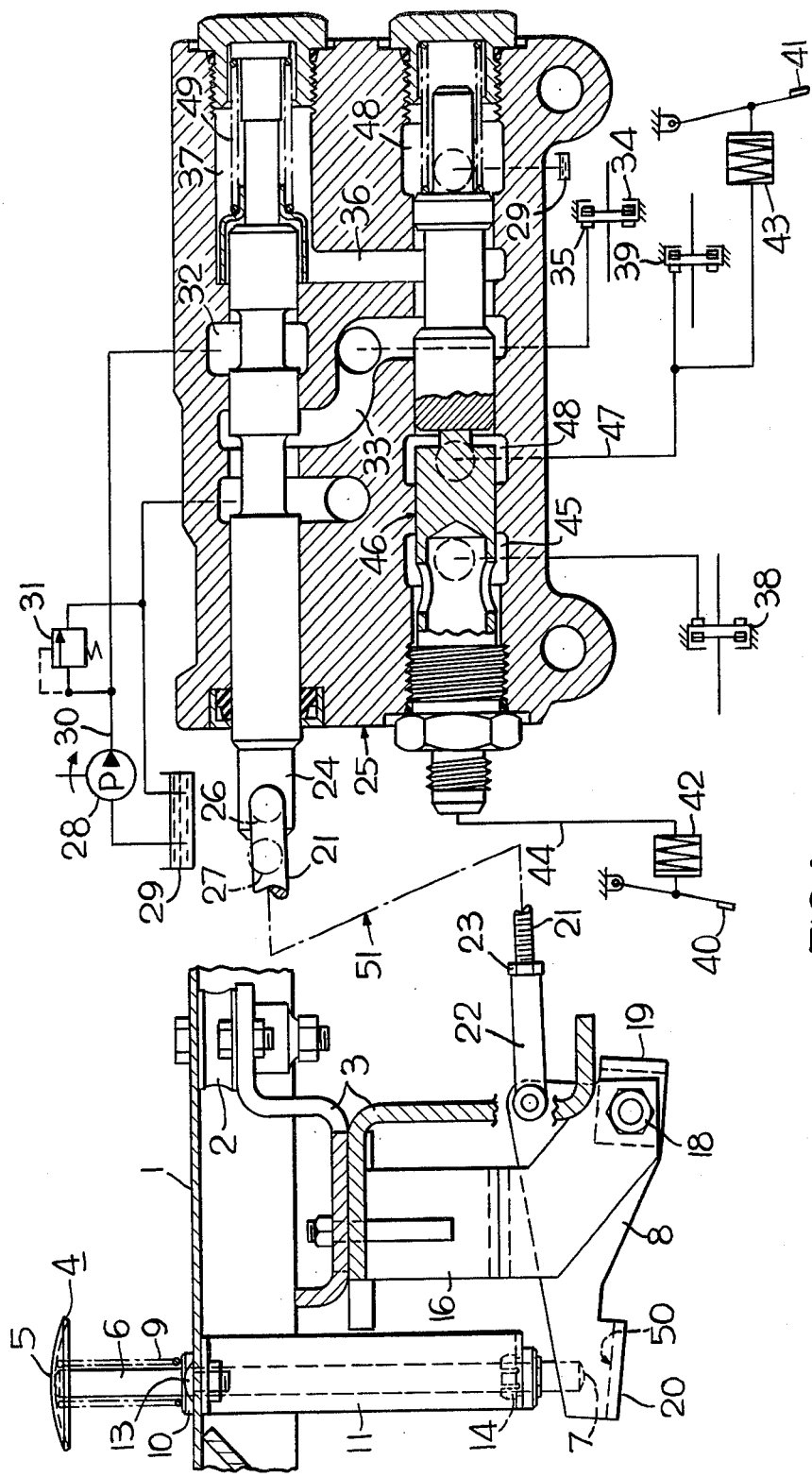
FIG. 1 is a side elevation view of the differential lock control including a foot operated control element and the actuating mechanism and a cross section view of the differential lock valve.
Figure 2:
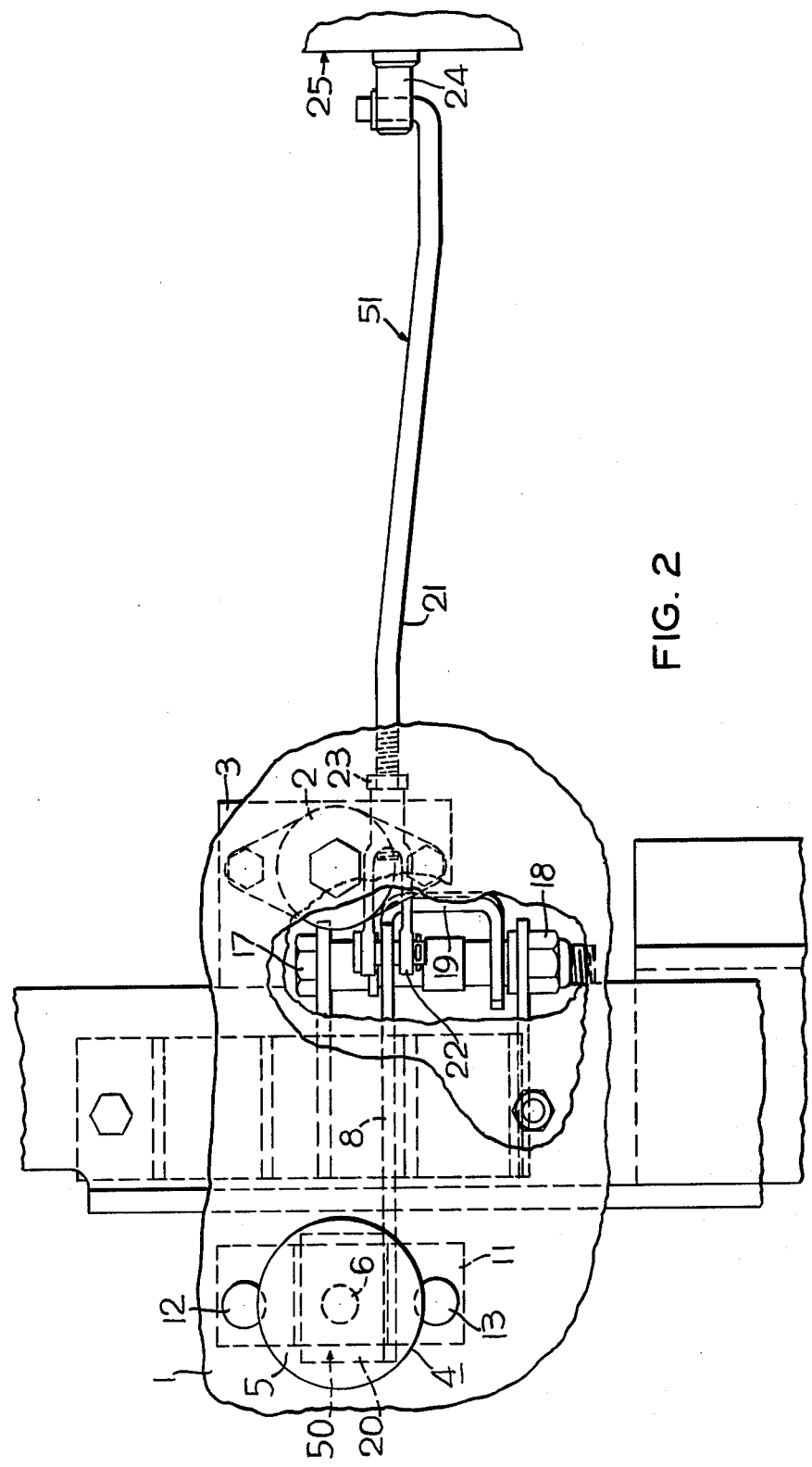
FIG. 2 is a plan view of the differential lock control.

When the control element 4 is actuated, it is depressed causing the round point 7 of push rod 6 to engage the surface 50. This causes a counterclockwise rotation of the bellcrank 8 pulling the link 21 in the left-hand direction as shown in FIG. 1. This in turn moves the spool 24 of the differential lock control valve 25 to the position 27. In this position, pressurized fluid from the pump 28 is allowed to flow through the chamber 32, passage 33, to lock the differential lock clutch 34. Pressurized fluid also passes through passage 36 to spring chamber 37 retaining the valve in the actuated position.

When the control element 4 is released, the spring 9 returns the control element to the retracted position as shown in FIG. 1. When it is desired to release the differential clutch 34, either of the brakes 40 or 41 is actuated which in turn pressurizes fluid in the master cylinders 42 or 43 to operate the relay valve 46. As the relay valve 46 moves to the right, the continuity between passage 33 and passage 36 is interrupted and pressurized fluid in the spring chamber 37 is allowed to pass to the reservoir chamber 48 to the reservoir 29. This in turn allows the spring 49 to return the spool 24 to its retracted position 26. In order to actuate the differential lock control valve again to engage the clutch 34, the foot operated control element 4 must be depressed to again rotate the bellcrank 8 and move the spool 24 to the actuated position 27.

The embodiments of the invention in which an exclusive property or privilege is claimed are defined as follows:

1. A control for a differential lock comprising, a vehicle platform resiliently mounted on a vehicle chassis, a foot operated control element mounted on said platform normally biased to a return position, an actuating mechanism mounted on said vehicle chassis including an engaging surface for momentary engagement with said control element when said control element is actuated, an actuating surface on said control element for selectively operating against said engaging surface and normally retracted in spaced relation from said engaging surface, a control valve operatively connected to said mechanism and to said differential lock, said control valve including detent means for selectively retaining said valve in a differential lock position, means biasing said control valve and said mechanism to a retracted and differential released position when said detent means is released.

2. A control for a differential lock as set forth in claim 1 wherein said control element includes a button and push rod reciprocally mounted on said platform.

3. A control for a differential lock as set forth in claim 1 wherein said mechanism comprises a bellcrank.

4. A control for a differential lock as set forth in claim 1 wherein said control valve comprises a hydraulic differential lock spool valve.

5. A control for a differential lock as set forth in claim 1 wherein said actuating surface defines a rounded end on said control element, a lever in said mechanism having a flange defining said engaging surface engaging said rounded end on said control element when said control element is actuated.

6. A control for a differential lock as set forth in claim 1 including means in said differential lock control valve for releasing said control valve responsive to actuation of a vehicle brake.

7. A control for a differential lock as set forth in claim 1 including a relay valve in said control valve, said control valve comprising a hydraulic differential lock spool, a hydraulic brake system including conduit means connected to said relay valve adapted for operating said relay valve to release said detent means of said differential lock spool and return said control valve to its retracted position when said brake system is actuated.

8. A control for a differential lock as set forth in claim 1 including means resiliently mounting said platform on said chassis.

9. A control for a differential lock as set forth in claim 1 wherein said actuating mechanism includes a link and an adjustable means connected to said valve to adjust said link relative to said control valve.

10. A control for a differential lock as set forth in claim 1 wherein said valve comprises a hydraulic differential lock spool valve, a hydraulic relay valve in said hydraulic differential lock spool valve, a hydraulic brake system connected to said relay valve, responsive to actuation of said brake system, said detent means including hydraulic means in said hydraulic differential lock spool valve for releasing said valve and biasing said valve to return to its retracted position when said brake system is actuated.

* * * * *